J. B. HADAWAY.
STITCH RUBBING AND CHANNEL ROUGHENING MACHINE.
APPLICATION FILED JULY 17, 1916.

1,217,595.

Patented Feb. 27, 1917.

INVENTOR.
John B. Hadaway.

UNITED STATES PATENT OFFICE.

JOHN B. HADAWAY, OF SWAMPSCOTT, MASSACHUSETTS, ASSIGNOR TO UNITED SHOE MACHINERY COMPANY, OF PATERSON, NEW JERSEY, A CORPORATION OF NEW JERSEY.

STITCH-RUBBING AND CHANNEL-ROUGHENING MACHINE.

1,217,595.  Specification of Letters Patent.  Patented Feb. 27, 1917.

Application filed July 17, 1916. Serial No. 109,686.

*To all whom it may concern:*

Be it known that I, JOHN B. HADAWAY, a citizen of the United States, residing at Swampscott, in the county of Essex and State of Massachusetts, have invented certain Improvements in Stitch-Rubbing and Channel-Roughening Machines, of which the following description, in connection with the accompanying drawings, is a specification, like reference characters on the drawings indicating like parts in the several figures.

This invention relates to machines for use in the manufacture of boots and shoes, and is herein illustrated in connection with a machine for rubbing the stitches of an outsole and for roughening the channel preparatory to applying cement to said channel to cause the channel flap, when laid, to adhere to it.

In the manufacture of boots and shoes it is customary to produce a channel on the tread face of an outsole by cutting and raising a flap along the edge thereof, to attach the outsole to the upper by a row of stitches which pass through the bottom of this channel, and then to apply cement to the channel and lay the flap over the stitches. The channel flap is commonly so thin that, after it is laid, the stitches will produce irregularities on its tread surface if said stitches are not smoothed in some way prior to the laying of the flap. When, however, the stitches are smoothed by being rubbed in the usual manner, the bottom of the channel through which they protrude tends to become glazed to such an extent that the cement, which is subsequently applied, does not adhere properly to it.

One feature of the present invention comprises a combined stitch rubbing and channel roughening tool comprising alternately arranged rubbing and roughening portions, and means for causing said portions to act successively upon the work. In the illustrated embodiment of the invention a rotary tool is provided with spaced rubbing projections and with bunches of wire bristles located between said projections; and the work is held up against and moved along beneath this tool.

This and other features of the invention, including certain details of construction and combinations of parts will be described in connection with an illustrative machine and pointed out in the appended claims.

Referring now to the accompanying drawings,—

Figure 1:
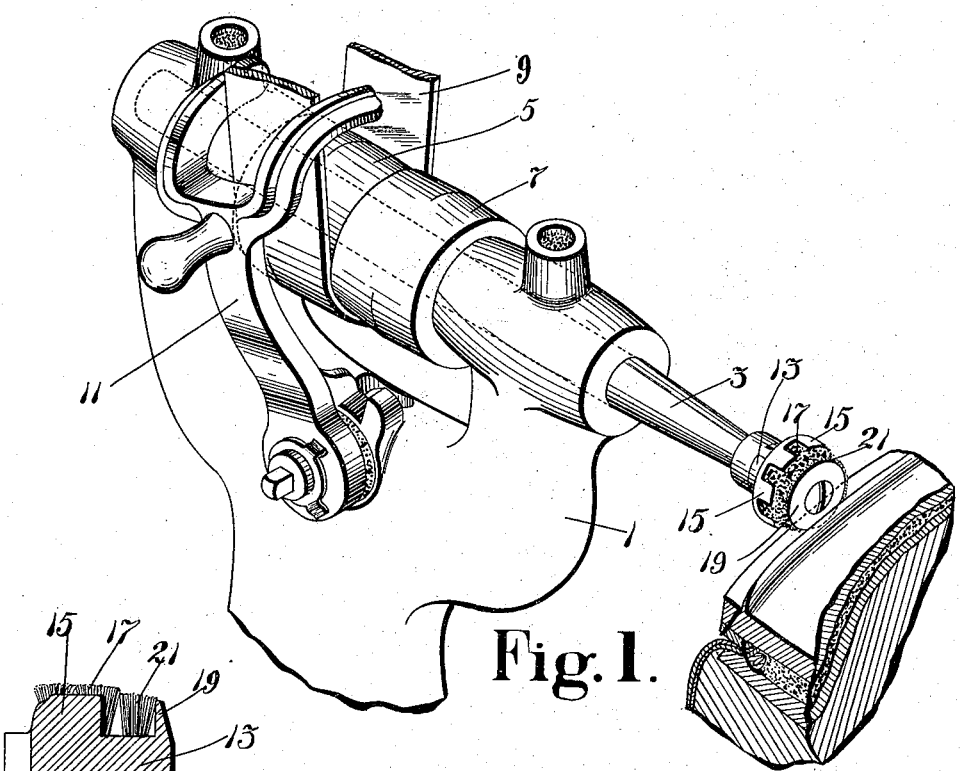
Figure 1 is a perspective of a machine in which the present invention is embodied showing the channel of an outsole in the process of being roughened.

Mounted in suitable bearings in the frame 1 of the machine is a shaft 3 carrying the usual fast and loose pulleys 5, 7 upon either one of which a belt 9 may be caused to run by moving a belt shifter 11. The shaft 3 extends well out from the frame of the machine so as to provide on all sides a free and unobstructed space; and at its outer end is fastened a combined stitch rubbing and channel roughening tool comprising a hub 13 provided at one end with a plurality of spaced rubbing projections 15 and with bunches of wire bristles 17 located in the spaces between the projections. At the other end of the hub is a gage in the form of a flange 19, and between the flange and the row of projections 15 and bristles 17 is an uninterrupted row of wire bristles 21.

Figure 2:
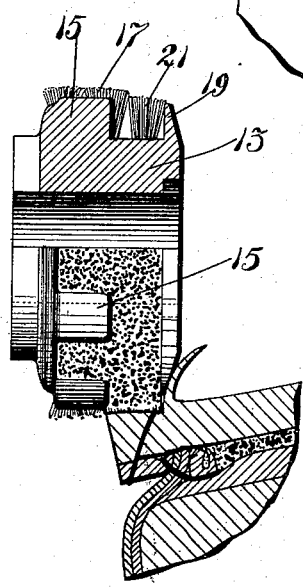
Fig. 2 is a detail section showing the tool being used as in Fig. 1.
Figure 3:
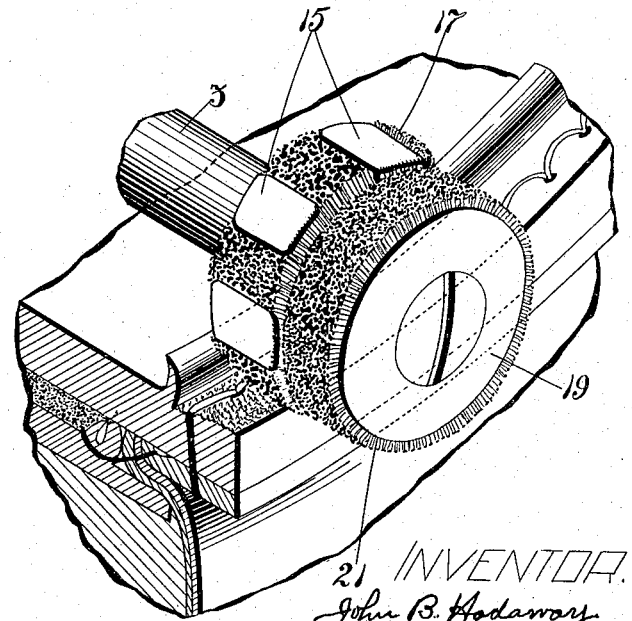
Fig. 3 is a detail perspective in which the combined action of rubbing the stitches and roughening the channel is shown.

When it is desired to rub the stitches and roughen the channel, the shoe is presented to the rotating tool in the manner illustrated in Fig. 3. When so used the base of the hub 15 contacts with the base of the channel flap and aids the operator in guiding the shoe. As the shoe is moved along beneath the tool the stitches are rubbed and pounded down by the rigid projections 15, and the bottom of the channel is roughened by the wire bristles 17. In some cases it may be desired merely to roughen the channel; or, after the rubbing and roughening tool has been applied, it may be desired to give an additional roughening to the bottom of the channel. In either case the tool is applied as illustrated in Figs. 1 and 2, the gage 19 in such case running in contact with the base of the channel flap, and the bristles 21 serving to roughen the bottom of the channel. It should be noted that in order to permit both the presentation shown in Figs. 1 and 2 and that shown in Fig. 3 it is essential that the space beneath and adjacent to the tool be free and unobstructed, so that the shoe may be freely manipulated to cause the tool to operate upon the whole extent of the channel.

Although the invention has been set forth in connection with a particular machine and has been illustrated as used in connection with a welt shoe, it should be understood that the particular type of shoe to be operated upon is immaterial and that the invention is not limited in the scope of its application to the particular machine which has been shown and described.

Having thus described my invention, I claim as new and desire to secure by Letters Patent of the United States:

1. A combined stitch rubbing and channel roughening tool comprising alternately arranged rubbing and roughening portions, and means for rotating said tool.

2. A combined stitch rubbing and channel roughening tool comprising rubbing and roughening portions, and means for causing said portions to act successively.

3. A combined stitch rubbing and channel roughening tool comprising a hub having spaced rigid radial projections alternated with bunches of wire bristles.

4. A combined stitch rubbing and channel roughening tool comprising a hub having at one end a gage and an uninterrupted row of bristles and at the other end a plurality of spaced projections alternated with bunches of bristles.

5. A machine of the class described, having, in combination, a rotary shaft, and a tool fast thereto, there being a free and unobstructed space beneath said tool to permit manual presentation of a shoe, said tool comprising a hub having a plurality of spaced stitch rubbing members, and roughening members located in the spaces between said rubbing members.

In testimony whereof I have signed my name to this specification.

JOHN B. HADAWAY.

Copies of this patent may be obtained for five cents each, by addressing the "Commissioner of Patents, Washington, D. C."